（12）United States Patent
Hwang et al.

(10) Patent No.: US 8,120,656 B2
(45) Date of Patent: Feb. 21, 2012

(54) ASSEMBLY MODULE HAVING A VIDEO TRANSMISSION ELEMENT

(75) Inventors: Shih-Ming Hwang, Irvine, CA (US); Liang-Lun Hwang, Irvine, CA (US); Chien-Jong Hwang, Irvine, CA (US)

(73) Assignee: Shih-Ming Hwang, Irvine, CA (US)

( * ) Notice: Subject to any disclaimer, the term of this patent is extended or adjusted under 35 U.S.C. 154(b) by 1182 days.

(21) Appl. No.: 11/902,820

(22) Filed: Sep. 26, 2007

(65) Prior Publication Data

US 2009/0079826 A1 Mar. 26, 2009

(51) Int. Cl.
*H04N 7/18* (2006.01)
*H04N 5/225* (2006.01)

(52) U.S. Cl. ......... 348/143; 348/373; 348/133; 348/794
(58) Field of Classification Search .................. 348/143, 348/150–161, 169, 373, 794, 800, 133
See application file for complete search history.

(56) References Cited

U.S. PATENT DOCUMENTS

| 6,761,342 | B1 * | 7/2004 | Giefer et al. | 248/343 |
| 2007/0126872 | A1 * | 6/2007 | Bolotine et al. | 348/151 |
| 2008/0028237 | A1 * | 1/2008 | Knight | 713/300 |

* cited by examiner

*Primary Examiner* — Karen Tang
*Assistant Examiner* — Cheikh Ndiaye
(74) *Attorney, Agent, or Firm* — Bacon & Thomas, PLLC

(57) ABSTRACT

This invention is to provide an assembly module comprising a board, a frame disposed on a surface of the board, and a circuit board disposed on another surface of the board, wherein the circuit board includes a power line and an image transmission line for directly connecting to a camera power line and a video cable of a surveillance camera respectively. A hollow padding is added into a wire passing hole disposed in the board, and a size of the hollow padding may be adjusted according to the width of a wire of the surveillance camera, which passes through the hollow padding. Therefore, problems such as needing to make enough space in a wall or a ceiling for receiving a video transmitter, requiring an additional device for connecting to power supply, and having gaps being left between the wire and the wire passing hole may be resolved simultaneously.

1 Claim, 4 Drawing Sheets

ASSEMBLY MODULE HAVING A VIDEO TRANSMISSION ELEMENT

FIELD OF THE INVENTION

The invention relates to an assembly module, and more particularly to an assembly module having a video transmission element for integrating multiple types of video processing and transmitting functions as a whole.

BACKGROUND OF THE INVENTION

Thanks to constant advancements in technology, a variety of new electronic products are constantly being introduced with improved functions compared to the conventional designs that consumers have encountered. This has benefited consumers with the development of various novel and convenient products, and consequently such electronic products have become tightly woven into our daily lives. For instance, the invention of surveillance cameras has brought along considerable convenience and protection for people by providing surveillance and enhancing the security for its users. In addition, an assembly module for connecting and supporting a surveillance camera can enhance the effectiveness and concealability of the surveillance camera. A refined and functionally comprehensive assembly module may save the time and space required for assembling other components of the surveillance camera, making such an assembly module an essential installation accessory of the surveillance camera.

A variety of conventional assembly modules are available for connecting and supporting a surveillance camera. As shown in FIGS. 1 and 2, a conventional assembly module 1 comprises a board 10, a frame 11, and a video transmitter 12; wherein the frame 11 is disposed on a surface of the board 10, and the video transmitter 12 is disposed on another surface of the board 10; the frame 11 has a connection base 110 disposed at an end being connected to the board 10, and the frame 11 further includes a support 112 disposed on one surface of the connection base 110 for installing a surveillance camera 7 thereon. Further, the support 112 extends toward a direction away from the connection base 110, and the support 112 has a reversed aperture 113 disposed on an end thereof being connected to the surveillance camera 7. Moreover, the connection base 110 has a plurality of second holes 111 disposed around the support 112, while the board 10 has a plurality of first holes 100 disposed in correspondence to the second holes 111 thereon; a plurality of fixing components 14 are fittingly disposed through the holes 100 and 111 of the assembly module 1 in order to connect the board 10 to the frame 11.

The board 10 further includes a wire passing hole 101 in the proximity of the frame 11; the video transmitter 12 is disposed on another surface of the board 10, and a surface of the video transmitter 12 facing away from the board 10 has thereon a first connector 120 for transmitting surveillance images to a monitoring device (not shown in the drawing), and a second connector 121 for transmitting the surveillance images from the surveillance camera 7 to the video transmitter 12.

However, the aforesaid assembly module 1 has the following disadvantages with regard to installation thereof:
1. Referring to FIG. 2, the video transmitter 12 of the assembly module 1 is physically large, thus requiring a large space for the video transmitter 12 when the assembly module 1 is installed onto a wall or a ceiling. Therefore, it becomes necessary to make enough space for receiving the video transmitter 12 on the wall or ceiling, which makes the installation process inconvenient and laborious, and affects the allocation of wire installed in the wall or ceiling.
2. Referring again to FIGS. 1 and 2, because the assembly module 1 does not provide a device for connecting to a power supply, a camera power line 71 for the surveillance camera 7 must be extended to a device that provides a power supply. Consequently, the wiring of the camera power line 71 during installation of the surveillance camera 7 is inconvenient.
3. Referring to FIG. 1, since the size of the wire passing hole 101 cannot be altered, when a video cable 70 and the camera power line 71 of the surveillance camera 7 are passing through the wire passing hole 101 from the surface of the board 10 facing the frame 11 and pulled out from another surface of the board 10, if the diameter of the video cable 70 and the camera power line 71 together is less than the diameter of the wire passing hole 101, gaps may be left between the wire (i.e. the video cable 70 and the camera power line 71) and the wire passing hole 101, which makes the appearance of the assembly module 1 less adequate.

In summary, it is urgent for the designers and the manufacturers of video surveillance cameras to develop a novel assembly module having a video transmitter that solves the problems existing in conventional assembly modules so that the installation thereof may be made more convenient, and the installation appearance of the surveillance cameras looks more professional.

SUMMARY OF THE INVENTION

In light of the problems existing in conventional assembly modules, the inventor of the present invention conducted research that has culminated in the assembly module having a video transmission element of the present invention.

An objective of the present invention is to provide an assembly module having a video transmission element; the assembly module comprises a board, a frame disposed on a surface of the board, and a circuit board disposed on another surface of the board; the circuit board includes a connector and a video transmission element, thus eliminating the need to build a large video transmitter into the assembly module. Therefore, the problem of needing to make enough space in a wall or a ceiling for receiving the video transmitter, which makes the installation process inconvenient and laborious and affects the allocation of wires in the wall or the ceiling, is resolved.

Another objective of the present invention is to install a power line and an image transmission line to the circuit board for directly connecting to a camera power line and a video cable of a surveillance camera respectively. Therefore, the problem of the absence of a device for connecting to the power supply in conventional assembly modules may be resolved so that the power cable of the surveillance camera does not need to be extended to the device that provides the power supply, facilitating the wiring of the camera power line during installation.

A further objective of the present invention is to install a hollow padding to a wire passing hole disposed in the board in such a way that the hollow padding is compatible with the wire passing hole. A wire (including both the camera power line and video cable of the surveillance camera) may pass through the hollow padding in the wire passing hole, and the diameter size of the hollow padding hole may be adjusted in order to suit the diameter of the wire that goes through the hollow padding. When the video cable and the camera power line pass through the hollow padding from a surface of the board facing the frame and is pulled out from another surface of the board, no gaps would be left between the wire and the hollow padding, and thus the problem of gaps being left between the wire and the wire passing hole and affecting the appearance of the assembly module may be resolved.

BRIEF DESCRIPTION OF DRAWINGS

The structure and the technical means adopted by the present invention to achieve the above and other objectives can be best understood by referring to the following detailed description of the preferred embodiments and the accompanying diagrams, wherein.

DETAILED DESCRIPTION OF PREFERRED EMBODIMENTS

Figure 1:
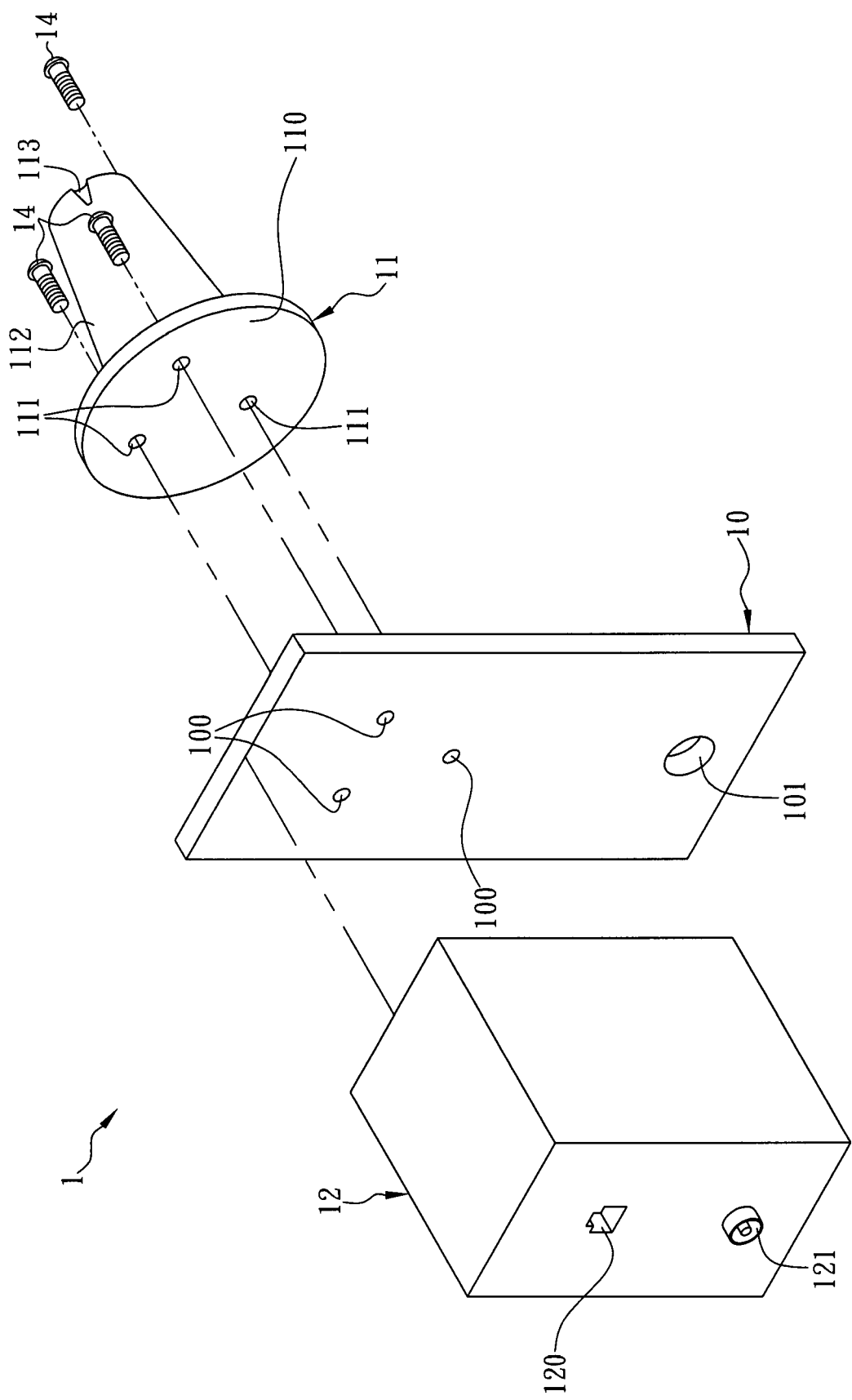
FIG. 1 is an exploded view that shows a conventional assembly module.
Figure 2:
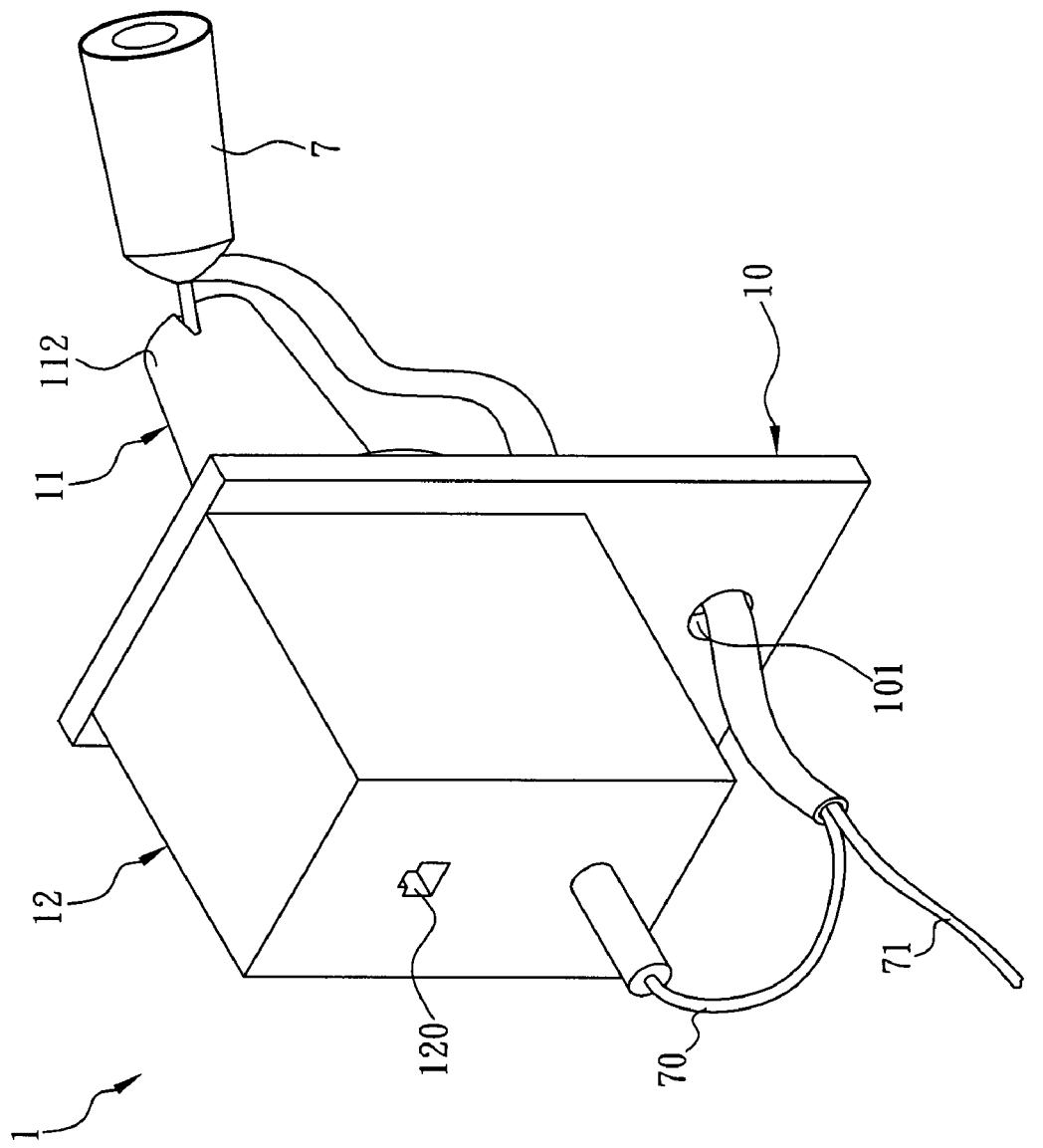
FIG. 2 is a schematic view that shows the usage of a conventional assembly module.
Figure 3:
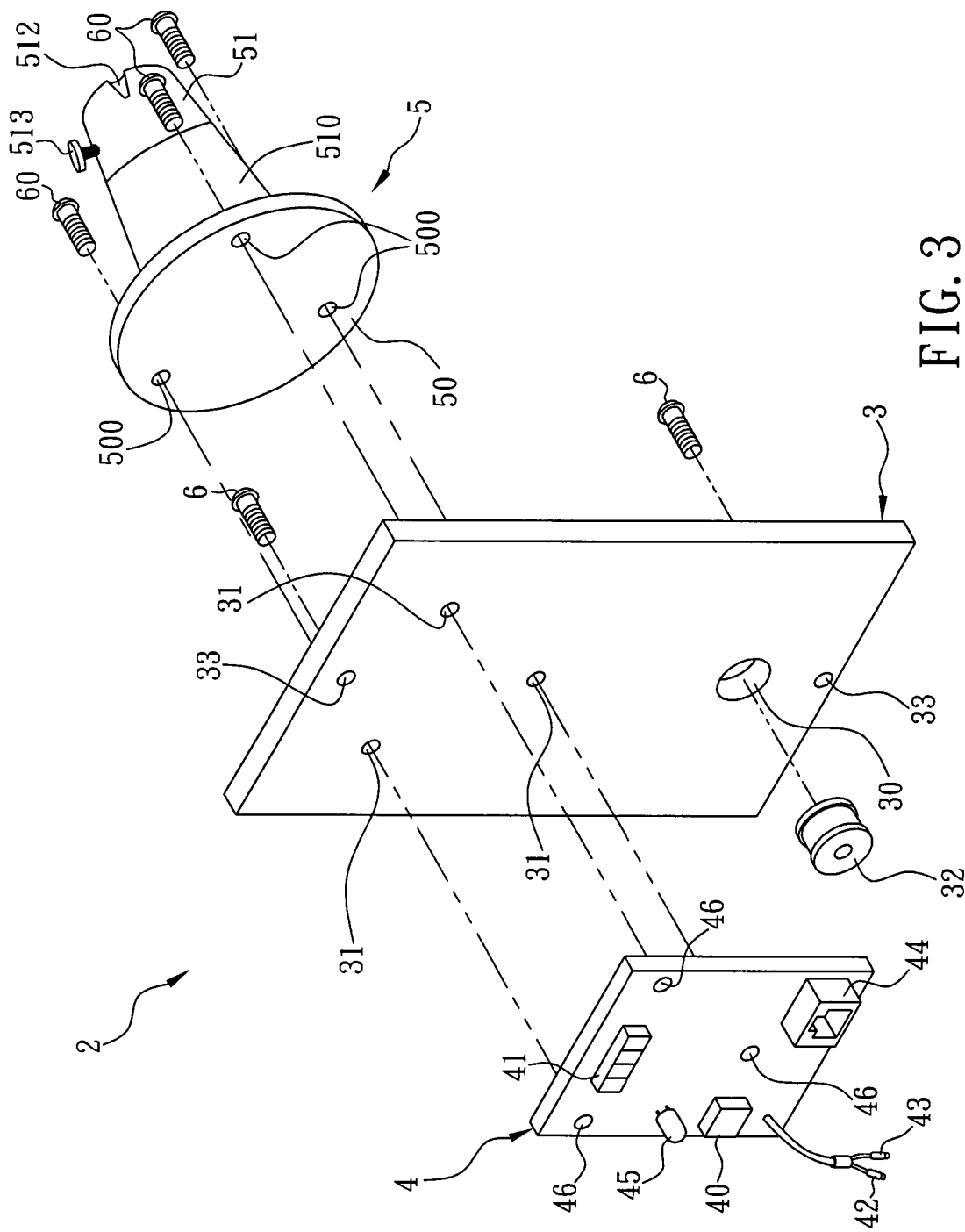
FIG. 3 is an exploded view that shows an assembly module according to a preferred embodiment of the present invention.
Figure 4:
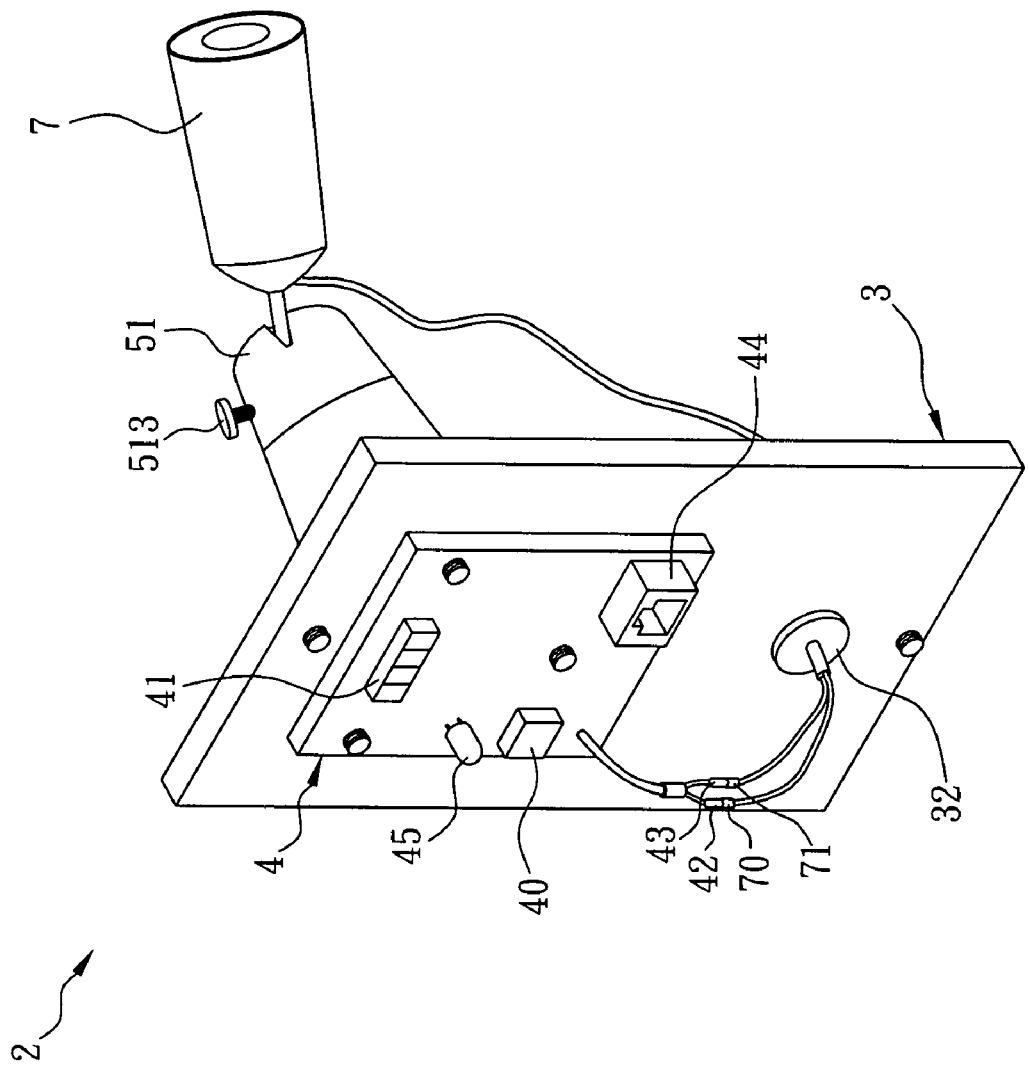
FIG. 4 is a schematic view that shows the usage of the assembly module according to a preferred embodiment of the present invention.

Referring to FIGS. 3 and 4, an assembly module 2 having a video transmission element is disclosed in the present invention. The assembly module 2 comprises a board 3 for securely installing onto a ceiling or a wall. The assembly module 2 further includes a circuit board 4 disposed on a surface of the board 3 and a frame 5 disposed on another surface of the board 3. The frame 5 is used to install a surveillance camera 7, and the circuit board 4 comprises a video transmission element 40, a first connector 41, a power line 43, and a signal transmission line 42. As a result, the assembly module 2 is reduced in physical size thereof, which makes the installation of the assembly module 2 more convenient and less time-consuming.

FIGS. 3 and 4 show a preferred embodiment of the present invention. The board 3 includes a wire passing hole 30 disposed in the proximity of the frame 5, and the wire passing hole 30 includes a compatible hollow padding 32 therein. The hollow padding 32 is used in combination with the wire passing hole 30 so that a video cable 70 and a camera power line 71 of the surveillance camera 7 may pass through the wire passing hole 30 from a surface of the board 3 facing the frame 5 to another surface of the board 3. Further, the diameter of the opening of the hollow padding 32 may be adjusted according to the size of the video cable 70 and the camera power line 71 so as to prevent gaps from forming between the hollow padding 32 and the wire of the video cable 70 and the camera power line 71. In addition, the board 3 has at least two through openings 33 adjacent to lateral sides thereof, and at least two corresponding first fixing components 6 are fittingly disposed through the through openings 33 so as to allow the board 3 to be fixed onto the wall or the ceiling. Furthermore, the board 3 further includes thereon a plurality of first holes 31 in positions corresponding to the frame 5.

Still referring to FIGS. 3 and 4, the circuit board 4 has a plurality of second holes 46 disposed in positions corresponding to the first holes 31, and the circuit board 4 has the first connector 41 disposed at an end thereof away from the wire passing hole 30, while a second connector 44 is disposed at another end of the circuit board 4 adjacent to a lateral side; the second connector 44 may be a RJ-45 connector. The first connector 41 and the second connector 44 may be used to connect cables of different specifications (for example, coaxial cables, or insolated twisted-pair signal input), and transmit surveillance images to the video transmission element 40 for processing before transmitting the surveillance images to a monitoring device (such as a digital surveillance system, a digital recorder, or a computer). The circuit board 4 has the signal transmission line 42 and the power line 43 disposed on another end thereof, so that the video cable 70 and the camera power line 71 may be directly connected to the signal transmission line 42 and the power line 43. Therefore, power may be supplied to a circuit in the circuit board 4 via the first connector 41 or the second connector 44, the power is passed through the power line 43 to the camera power line 71 before being supplied to the surveillance camera 7; whereas the surveillance images are passed through the video cable 70 and the signal transmission line 42, and then sent to the video transmission element 40 for processing before being sent to the monitoring device via the first connector 41 or the second connector 44. As a result, the camera power line 71 does not need to be extended for connecting to a device that supplies power. Moreover, the circuit board 4 further has a lighting component 45 connected thereto for displaying a power status of the circuit board 4.

In addition, the circuit board 4 has the video transmission element 40 disposed between the first connector 41 and the signal transmission line 42; the video transmission element 40 has a video balun for enhancing noise-resistance of signals, and may be used in general insolated twisted-pair signal inputs instead of expensive coaxial cables. The video balun is modularized in the video transmission element 40 and reduced in size; when the surveillance images captured by the surveillance camera 7 are transmitted sequentially through the video cable 70 and the signal transmission line 42 to the video transmission element 40 on the circuit board 4, noises are firstly removed in the video transmission element 40, and then the processed surveillance images are transmitted to the monitoring device via the first connector 41 or the second connector 44 of the circuit board 4. Further, power may be supplied to the circuit board 4, the lighting component 45, the video transmission element 40, and the surveillance camera 7 via wires connected to the first connector 41 or the second connector 44.

Referring again to FIGS. 3 and 4, the frame 5 has a connection base 50 disposed at an end connected to the board 3, and a supporting portion 510 is extended from a surface of the connection base 50, which faces away from the board 3; the connection base 50 has a plurality of third holes 500 disposed around the supporting portion 510 that are corresponding to the first holes 31 and the second holes 46. The corresponding first holes 31, the second holes 46, and the third holes 500 located on the board 3, the circuit board 4, and the connection base 50 have second fixing components 60 fitted there through respectively, so as to secure the board 3, the circuit board 4, and the connection base 50 together.

In addition, the supporting portion 510 has a support 51 extended from an end thereof facing away from the connection base 50, so as to allow the surveillance camera 7 installed on the frame 5 to turn according to a position it is installed onto. A reversed aperture 512 is disposed at an end of the support 51 facing away from the supporting portion 510, and the reversed aperture 512 is extended from the end of the support 51 facing away from the supporting portion 510 toward a side of the support 51. The surveillance camera 7 is connected to the reversed aperture 512, and the reversed aperture 512 is combined with the support 51 so as to allow the surveillance camera 7 to face a variety of directions for monitoring. Moreover, a side of the support 51 has an aligning button 513 disposed thereon for allowing the surveillance camera 7 to turn or be fixed to face particular directions.

Although a preferred embodiment of the invention has been described for purposes of illustration, it is understood that various changes and modifications to the described embodiment can be carried out without departing from the scope and the spirit of the invention as disclosed in the appended claims.

What is claimed is:

1. An assembly module having a video transmission element, comprising:

a board having at least two through openings disposed on positions approximate to lateral sides thereof respectively, a plurality of first holes disposed thereon, and a wire passing hole disposed thereon for a wire of a surveillance camera to pass through, wherein the through openings are respectively fitted with at least two corresponding first fixing components, and the wire passing hole includes a compatible hollow padding disposed therein;

a frame being disposed on a surface of the board at a position away from the wire passing hole, and having the surveillance camera disposed on a surface thereof facing away from the board, wherein the frame has a plurality of third holes disposed thereon corresponding to the first holes; and a circuit board being disposed on another surface of the board, and comprising a power line and an image transmission line for connecting to the surveillance camera, a video transmission element for processing surveillance images received from the surveillance camera, a first connector for transmitting the processed surveillance images to a monitoring device and receiving power from a power source, and a lighting component for displaying a power status of the circuit board, wherein the circuit board has a plurality of second holes disposed thereon corresponding to the first holes, the board, the circuit board and the frame have a second fixing component respectively disposed through the holes thereof, and the first connector is a RJ-45 connector.

* * * * *